United States Patent [19]

Yamashita et al.

[11] Patent Number: 4,558,119

[45] Date of Patent: Dec. 10, 1985

[54] PROCESS FOR POLYMERIZATION OF 2,6-DISUBSTITUTED PHENOL

[75] Inventors: Izumi Yamashita, Yokohama; Kunio Toyama, Sodegauramachi, both of Japan

[73] Assignee: Asahi Kasei Kogyo Kabushiki Kaisha, Osaka, Japan

[21] Appl. No.: 623,501

[22] Filed: Jun. 22, 1984

[30] Foreign Application Priority Data

Jun. 28, 1983 [JP] Japan .................. 58-116498

[51] Int. Cl.$^4$ ............................ C08G 65/44
[52] U.S. Cl. .................... 528/215; 528/212; 528/217; 528/218
[58] Field of Search .............. 528/215, 212, 217, 218

[56] References Cited

U.S. PATENT DOCUMENTS

| | | | |
|---|---|---|---|
| 3,306,874 | 2/1967 | Hay | 528/215 |
| 3,573,257 | 3/1971 | Nakashio et al. | 528/215 |
| 3,787,361 | 1/1974 | Nakashio et al. | 528/215 |
| 3,825,521 | 7/1974 | Izawa et al. | 528/215 |
| 4,054,553 | 10/1977 | Olander | 528/215 |
| 4,083,828 | 4/1978 | Olander | 528/215 |
| 4,085,124 | 4/1978 | Rutledge | 528/215 |
| 4,093,597 | 6/1978 | Olander | 528/215 |
| 4,440,923 | 4/1984 | Bartmann et al. | 528/215 |

FOREIGN PATENT DOCUMENTS

| | | | |
|---|---|---|---|
| 2162299 | 12/1971 | Fed. Rep. of Germany . | |
| 86942 | 1/1972 | German Democratic Rep. . | |
| 30354 | 4/1970 | Japan . | |
| 30355 | 4/1970 | Japan . | |
| 48-27756 | 8/1973 | Japan | 528/215 |
| 7044625 | 9/1980 | Japan | 528/215 |
| 44625 | 6/1982 | Japan . | |

*Primary Examiner*—Lester L. Lee
*Attorney, Agent, or Firm*—Finnegan, Henderson, Farabow, Garrett & Dunner

[57] ABSTRACT

A process is described for oxidative polymerization of a monomeric 2,6-disubstituted phenol in the presence of a catalyst comprising a manganese compound, an N-alkylalkanolamine and a basic compound. The process produces a polyphenyleneether which does not exhibit deterioration in molecular weight and undesirable coloration when subject to heat, such as the heat ordinarily applied in molding. The polyethyleneether have excellent tensile strength and elongation.

7 Claims, No Drawings

PROCESS FOR POLYMERIZATION OF 2,6-DISUBSTITUTED PHENOL

BACKGROUND OF THE INVENTION

1. Field of the Invention

This invention relates to a process for polymerization of 2,6-disubstituted phenol, more particularly to a process for producing a polyphenyleneether by oxidative polymerization of a 2,6-disubstituted phenol in the presence of a basic compound, a manganese compound and an N-alkylalkanolamine. According to the process of this invention, there is provided a polyphenyleneether with little undesirable coloration having excellent tensile strength and elongation. The polyphenyleneether also exhibits no deterioration in molecular weight when hot molded.

2. Description of the Prior Art

A polymer produced by oxidative polymerization of a 2,6-disubstituted phenol is known as a polyphenyleneether. In recent years, this polymer has received attention as a thermoplastic engineering plastic material because of its excellent mechanical properties, good electrical characteristics, good heat resistance, low absorbability of water and good dimensional stability.

For oxidative polymerization of a 2,6-disubstituted phenol, manganese catalyst system and copper catalyst system are known in the art. A large number of combinations of a copper salt or a manganese compound with various amines have hitherto been proposed in many patent publications. For example, Japanese Patent Publication No. 30,335/1970 describes various combinations of a manganese compound and a basic compound with a primary, secondary or tertiary amine. In such a combination, suitable amines include aliphatic primary amines such as methylamine, ethylamine, propylamine and butylamine and the like; cyclic hydrocarbon primary amines such as cyclohexylamine and the like; diamines such as ethylenediamine, triethylenediamine, hexamethyldiamine and the like; aliphatic secondary amines such as dimethylamine, diethylamine, dipropylamine, dibutylamine and the like; cyclic hydrocarbon secondary amines such as dicyclohexylamine and the like; alicyclic secondary amines such as piperidine, piperazine, morpholine, and the like; aliphatic tertiary amines such as trimethylamine, triethylamine, diethylmethylamine, dimethylpropylamine, dimethylethylamine, benzylmethylamine, dioctylbenzylamine, dioctychlorbenzylamine, (chlorophenethyl)bromobenzylamine, 1-dimethylamino-2-phenylpropane and the like; tertiary polyamines such as N,N,N', N'-tetraalkylphenylenediamines, N,N'-dialkylpiperidines, hexamethylenetetramine and the like; pyridines such as pyridine, picoline, cholidine and the like and cyclic amines such as N-alkylpyrole, N-alkylpyrolidine, N-alkylpiperidine, quinoline, isoquinoline, N-alkyltetrahydroquinoline, N-alkylmorpholine and the like. The disclosure of the aforesaid patent publication further mentions that these cyclic amine may include derivatives where one or more hydrogen atoms on a carbon atom member forming the heterocyclic nucleus is substituted by alkyl, alkoxy, or an isomeric or a homologuous group thereof.

However, the polyphenyleneether obtained using a primary amine as mentioned above does exhibit significant lowering in molecular weight upon melting by heating. Furthermore, the polymer has low-strength as well as low elongation in tensile test. With use of a secondary amine as mentioned above, the catalytic polymerization activity featured by a manganese compound-basic compound catalyst system is markedly lowered and such a catalyst system does not produce a high molecular weight polymer. Further, use of a tertiary amine as mentioned above, results in a brittle polymer which exhibits a reduction lowering in molecular weight when melted by heating.

It is also proposed in U.S. Pat. No. 4,083,828, to combine a secondary amine with a manganese salt and a basic compound. This combination also involves drawbacks similar to those mentioned before.

Further, a combination of a monoethanolamine or a diethanolamine or both with a manganese salt and a basic compound have also been described in Japanese Laid-open Patent Publication No. 44625/1982. However, a polymer obtained with use of ethanolamine still exhibits lowering in molecular weight when melted by heating, and low tensile strength and elongation. Moreover, the polymer, as molded, is brownish in color and thus undesirable for commercial use. With diethanolamines, such drawbacks as a poor resistivity of catalytic activity to the presence of water and lowered catalytic polymerization activity are encountered.

In addition to the above, the prior combination catalysts need use of large quantity of amine when used in combination with either a manganese compound or a copper salt.

In contrast to the catalyst containing an amine component, a bicomponent catalyst consisting of manganese compound and a basic compound, such as sodium hydroxide, is described in U.S. Pat. No. 3,573,257. Although the bicomponent catalyst produces a higher polymerization rate at low cost, it is very difficult to control the molecular weight of the polymer product because of an abrupt increase in molecular weight in the later stage of the polymerization reaction. In addition, the polymer obtained is very brittle and has the disadvantage of a poor thermal stability, i.e., the molecular weight of the polymer deteriorates upon melting by heating.

In view of the state of the art described above, the inventors have made extensive studies to develop a polymerization catalyst having high catalytic activity which can produce a little colored polyphenyleneether having a reduced tendency to exhibit a decrease in molecular weight when the polymer is melted by heating, and having excellent tensile strength and elongation. It has now been found that a catalyst comprising a combination of a manganese compound and a basic compound with a N-alkylalkanolamine can achieve the aforesaid object. This invention is based on this novel finding.

DETAILED DESCRIPTION OF THE INVENTION

This invention provides a process for oxidative polymerization of a 2,6-disubstituted phenol by coupling with an oxygen containing gas in the presence of a catalyst comprising a manganese compound, a basic compound selected from hydroxides of group I-A of the periodic table, alkoxides and phenoxides, and a N-alkylalkanolamine.

The 2,6-disubstituted phenol in the process of this invention is represented by the formula (I):

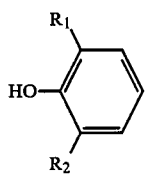

(I)

wherein $R_1$ is a hydrocarbon group having 1 to 4 carbon atoms and $R_2$ is a halogen or a hydrocarbon group having 1 to 4 carbon atoms. Such compounds may include, for example, 2,6-dimethylphenol, 2-methyl-6-ethylphenol, 2-ethyl-6-n-propylphenol, 2-methyl-6-chlorophenol, 2-methyl-6-bormophenol, 2-methyl-6-isopropylphenol, 2-methyl-6-n-propylphenol, 2-ethyl-6-bromophenol, 2-methyl-6-n-butylphenol, 2,6-di-n-propylphenol, 2-ethyl-6-chlorophenol, 2-ethyl-6-chlorophenol. Among these 2,4-disubstituted phenols, 2,6-dimethylphenol is especially important.

The polymerization system may also contain small amounts of phenols, such as ortho-cresol, metacresol, paracresol, 2,4-dimethyl phenol, 2-ethylphenol and the like.

Suitable as the manganese compound component of catalyst are such manganese compounds as, for example, manganese salts, manganates such as sodium manganate and potassium manganate, permanganates such as sodium permanganate and potassium permanganate, manganese acetylacetonate, and the like. Manganese salts include, for example, manganese halides such as manganese chlorides, manganese bromides, manganese iodides; manganese salts of an inorganic oxiacid such as manganese nitrates, manganese sulfates, manganese carbonates; manganese salts of organic acids such as manganese formate, manganese acetate, manganese oxalate, manganese stearate, manganese octoate, manganese benzoate, manganese hydroxides, manganese oxides and the like.

The manganese compound component of the catalyst is present preferably in an amount of at least 0.5 mol %, more preferably 0.5 to 3 mol %, based on the 2,6-disubstituted phenol.

The basic compound component of the catalyst may be, for example, hydroxides of a metal of group I-A of the periodic table, such as lithium hydroxide, sodium hydroxide, potassium hydroxide and the like; alkoxides such as sodium methoxide, potassium methoxide, sodium ethoxide, sodium-n-propoxide, sodium isopropoxide, potassium-t-butoxide and the like; phenoxides such as lithium phenoxides, sodium phenoxide, potassium phenoxide and the like. The phenol constituting the phenoxides may be substituted with halogens or hydrocarbon groups having 1 to 4 carbon atoms. Among these basic compounds, sodium hydroxide and potassium hydroxide are preferred. These compounds may be used alone as the basic compound component of the catalyst or a combination of one or more of these compounds may be used.

The amount of basic compound in the catalyst preferably ranges from about 1 mol % to about 20 mol %, more preferably from 2 mol % to 10 mol %, based on the weight of 2,6-disubstituted phenol in the polymerization reaction system.

The N-alkylalkanolamine component in the present process includes, for example, N-methylethanolamine, N-ethylethanolamine, N-n-propylethanolamine, N-n-butylethanolamine, N-cyclohexylethanolamine, N-methylisopropanolamine, N-ethylisopropanolamine and the like.

A preferred N-alkylalkanolamine is N-alkylethanolamine of which the alkyl group is a saturated alkyl group having 1 to 4 carbon atoms.

N,N'-dialkylalkanolamines such as N,N-dimethylethanolamine, N,N-diethylethanolamine, N,N-diisopropylethanolamine, N,N-dibutylethanolamine are not suitable because they do not produce an improved polymer in which lowering of molecular weight upon heating is suppressed.

The amount of an N-alkylalkanolamine in the catalyst preferably ranges from about 0.5 mol % to about 10 mol %, more preferably from 1 mol % to about 6 mol %, based on the weight of 2,6-disubstituted phenol in the polymerization reaction system.

In carrying out a polymerization reaction of the present process, a manganese compound, a N-alkylalkanolamine and a basic compound are introduced into a reactor before a monomeric phenol is introduced. The three components may be introduced to the reactor by charging them separately in any sequence to produce a catalytic admixture or in the form of a catalytic admixture prepared beforehand. The catalytic admixture is prepared at a temperature of from 0° C. to 100° C., preferably from 10° C. to 50° C. Use of a medium capable of dissolving manganese compound is preferred in the preparation. Such medium includes, for example, alcohols such as methanol, ethanol, iso-propanol, n-propanol, n-butanol, benzyl alcohol, cyclohexanol and the like.

In the preparation of the catalytic admixture, it is preferable to carry out mixing the components in the presence of oxygen. Oxygen may be furnished by conducting the mixing in open air or by blowing oxygen or an oxygen containing gas, such as air and a gas containing 5 volume % or more oxygen, into proximity of the catalyst components during mixing.

A preferred catalytic admixture is prepared either by adding a N-alkylalkanolamine to a manganese compound in advance of incorporation of a basic compound, or by adding the N-alkylalkanolamine and the basic compound simultaneously to the manganese compound.

Oxidative polymerization of 2,6-di-substituted phenol will now be described. The polymerization reaction is initiated by introducing oxygen containing gas into the reactor. As an oxygen containing gas, oxygen, air or oxygen gas diluted by inert gas such as nitrogen, may be used. In general, the oxidative polymerization is carried out at a temperature from 0° C. to 100° C., preferably from about 10° C. to 50° C., more preferably from about 15° C. to 35° C. under an atmospheric pressure. The polymerization may be conducted under a pressurized condition if desired. The medium used in the oxidative polymerization is not limited, provided that it is inert to various kinds of radicals which may be formed intermediately in the course of the oxidative polymerization reaction. The medium should not be readily oxidizable, compared to the monomeric phenol to be oxidized. A suitable medium is a solvent capable of dissolving 2,6-disubstituted phenol and a part or a whole of the catalyst. Solvents preferably employed are solvents capable of dissolving a product polymer, for example, aromatic hydrocarbons such as benzene, toluene, ethylbenzene and the like, chlorinated hydrocarbons such as chloroform, 1,2-dichlorobenzene, trichloroethane, chlorobenzene, dichlorobenzene and the like, nitro compounds such as nitrobenzene and the like. Other solvents suitably employed are good solvents for the catalyst mixture. Representative examples of such solvents are alcohols such as methanol, ethanol, propanol, butanols, benzylalcohol, cyclohexanol and the like, ketones such as acetone, methylethyl ketone and the like, esters such as ethyl acetate, ethyl formate and the like, ethers such as diethyl ether, and tetrahydrofuran.

The reaction medium may be constituted with a solvent for polymer alone or with a combination comprising two or more solvents, such as a good solvent for the catalyst and a good solvent for the product polymer. Depending on the proportional ratio of the solvent for the catalyst and the solvent for the product polymer, the polymerization may be by either a solution polymerization method or by a precipitation polymerization method in which polymer is precipitated at the later stage of polymerization. In the process of this invention, it is preferred to employ precipitation polymerization.

The polymerization reaction may be carried out either batchwise or continuously. Termination of the polymerization reaction, isolation of polymer and purification of the polymer can be conducted according to known techniques. For example, the polymerization reaction can be brought to terminate by ceasing to charge oxygen and adding an acid, such as hydrochloric acid and sulfuric acid, or a chelating agent capable of deactivating the manganese compound of the reaction system.

The polymer as precipitated may be separated from the reaction medium by means of filtration or centrifugal separation. When the polymer is dissolving in the reaction medium, the dissolved polymer in the solution may be precipitated by adding antisolvent for the polymer to the product solution prior to the application of filtration or centrifugal separation. The isolated polymer is washed or rinsed with an acid containing solvent or water to remove remaining catalyst. For further purification, repetition of dissolving and reprecipitation techniques may be employed before drying to obtain purified polyphenyleneether.

As described above the present oxidative polymerization of 2,6-disubstituted phenol produces a high quality polyphenyleneether, which does not exhibit deterioration in molecular weight in molding by heating, having excellent strength and elongation, and having a little undesirable coloration.

EXAMPLES

The following examples illustrate the process of the present invention. They are merely illustrative and are not to be construed to limit the invention in any manner.

Designations, and methods and conditions for measurements described in the Examples and Comparative Examples are summarized below:

(i) Catalytic activity of the catalyst

Catalytic activity of the catalyst was evaluated in terms of reduced viscosity ($\eta_{sp}/C$) of as polymerized polymer. $\eta_{sp}/C$ of a chloroform solution of the polymer was measured at 30° C. by using a Cannon-Fenske viscometer. The concentration of the chloroform solution is 0.5 g of polymer per 100 ml of chloroform at 30° C.

(ii) Deterioration of polymer in molecular weight after heat treatment

The reduced viscosity $\eta_{sp}/C$ was measured at 30° C. with respect to a chloroform solution of a molded polymer by Cannon Fenske viscometer. The concentration of the chloroform solution is 0.5 g of the polymer per 100 ml of chloroform at 30° C. The molded polymer was a circular plate specimen having a dimension of 1.0 mm in thickness and 50 mm in diameter which was molded at 310° C. with a molding cycle of 20 minutes by a compression molding machine (Manufactured by Kabushikikaisha Toho Press Seisakusho).

When a molded polymer has a lower $\eta_{sp}/C$ than that of as polymerized polymer, there is an occurrence of deterioration in molecular weight in the molded polymer.

(iii) Coloration index of polymer

The circular plate specimen as described above was dissolved in chloroform to prepare a chloroform solution of the polymer as once molded at 310° C. The concentration of the chloroform solution is 0.5 g of polymer per 100 ml of chloroform at 30° C. The light absorption of the chloroform solution loaded in a transparent quartz glass cell with a thickness of 10 mm was measured with respect to a monochromatic light beam of 480 mμ using Double Beam Spectrophotometer #220 (Manufactured by Hitachi Seisakusho Company).

The coloration index was calculated by the formula below:

$$\text{Coloration Index of Polymer (C.I.P.)} = \frac{\log\left(\frac{I_o}{I}\right)}{a \cdot b} \times 100$$

In the formula, $I_o$ represents the intensity of the light beam through chloroform; I represents the intensity of the light beam through the chloroform solution of the polymer; a, length of load cell; b, concentration of the polymer in the chloroform solution.

(iv) Tensile properties of polymer

A dumbell test strip of 1 mm thickness was molded at 260° C. by the same compression molding machine as described above.

Strength and elongation of the strip was measured in accordance with JIS-K-6871.

EXAMPLE 1

122 g (1 mol) of 2,6-dimethylphenol was dissolved in a mixture containing 250 g of xylene and 200 g of n-butanol. The solution was charged into a 2-liter jacketed reactor equipped with a thermometer, a reflux condenser, a stirrer and an oxygen gas introducing nozzle, and the temperature of the solution in the reactor was adjusted at 30° C. by flowing a warm water into the jacket.

1.6 g (0.04 mol) of sodium hydroxide and 1.5 g (0.0075 mol) of tetrahydrate of manganese chloride dissolved in 25 g of methanol. The methanol solution of sodium hydroxide, the methanol solution of tetrahydrate of manganese chloride and 1.1 g (0.015 mol) of N-methylethanolamine were separately in the order named added to the 2,6-dimethylphenol solution under stirring in the presence of air in the reactor. Then, oxygen was blow into the reactor at a rate of 500 Nml/min so as to begin oxidative polymerization. The reaction temperature was adjusted at 30° C. by controlling the jacket temperature.

Thirty minutes after the beginning of the reaction, fine particles of polymer began to precipitate, and the reaction was further continued. After six hours from the initiation of the reaction, oxygen flow was stopped so as to terminate the polymerization reaction. After completion of the reaction, the precipitated polymer was separated by filtration and was rinsed with a mixture of hydrochloric acid and methanol, and the filtered polymer was further washed with fresh methanol followed by drying under vacuum at 145° C. for 30 minutes. The yield was 94% and $\eta_{sp}/C$ was 0.63. The $\eta_{sp}/C$ of the polymer after heat treatment at 310° C. was found to be 0.71, indicating no lowering in molecular weight. As the result of a tensile test, a compression molded strip was found to exhibit a yield strength of 710 Kg/cm$^2$ and an elongation of 30%. C.I.P. of the polymer was 4.7.

Comparative Example 1

Example 1 was repeated without addition of N-methylethanolamine. A polymer having a $\eta_{sp}/C$ of 1.2 was obtained at a yield of 97%. When this polymer was subjected to heat treatment, the $\eta_{sp}/C$ was lowered down to 0.48, showing a marked lowering in molecular weight.

EXAMPLES 2–7

Example 1 was repeated by changing the N-methylethanolamine or sodium hydroxide to the N-alkylalkanolamines or the basic compound as indicated in Table 1, and similar evaluations as in Example 1 were conducted for each polymer obtained. The results of the evaluations are shown in Table 1.

Comparative Example 2

Example 1 was repeated except using equimolecular amount of n-butylamine in place of N-methylethanolamine to obtain a polymer having $\eta_{sp}/C$ of 0.55 at a yield of 95%. After heat treatment, the $\eta_{sp}/C$ was lowered to 0.51, indicating that the lowering of molecular weight had not been suppressed completely. As the result of a tensile test, elongation was 8% and tensile yield strength was 720 Kg/cm$^2$. The polymer exhibits a C.I.P. of 7.6.

Comparative Example 3

Except for using an equimolecular amount of di(n-butyl)amine in place of N-methylethanolamine, the procedure of Example 1 was repeated. A low molecular weight polymer having a $\eta_{sp}/C$ of 0.35 was obtained. The $\eta_{sp}/C$ of the polymer after heat treatment was lowered to 0.35. The polymer had a elongation of 5%, a tensile yield strength of 700 Kg/cm$^2$. C.I.P. of the polymer was 7.1.

Comparative Example 4

Except that an equimolecular amount of tri(n-butyl)amine was used in place of N-methylethanolamine, Example 1, the procedure as described in Example 1 was repeated to obtain a polymer having a $\eta_{sp}/C$ of 0.70. However, the polymer was lowered in $\eta_{sp}/C$ after heat treatment to 0.32. This low $\eta_{sp}/C$ value of the heat treated polymer showed that molecular weight lowering of the product polymer by heating was not suppressed. C.I.P. of the polymer was 19.

Comparative Example 5

The procedure of Example 1 was repeated except that an equimolecular amount of monoethanolamine was used in place of N-methylethanolamine. A polymer with $\eta_{sp}/C$ of 0.60 was obtained. The $\eta_{sp}/C$ of this polymer was lowered after heat treatment to 0.53. As

TABLE 1

| Examples | Catalyst Component N—alkylalkanolamines | Basic Compounds | Viscosity of Polymer ($\eta$sp/C) as-polymerized | After Heat Treatment | Elongation (%) | Tensile Yield Strength (Kg/cm) | C.I.P. |
|---|---|---|---|---|---|---|---|
| 1 | N—methylethanolamine | NaOH | 0.63 | 0.71 | 30 | 710 | 4.7 |
| 2 | N—ethylethanolamine | NaOH | 0.59 | 0.60 | 27 | 700 | 4.5 |
| 3 | N—n-buthylethanolamine | NaOH | 0.57 | 0.58 | 23 | 720 | 5.0 |
| 4 | N—methylethanolamine | KOH | 0.61 | 0.68 | 28 | 700 | 4.7 |
| 5 | " | LiOH | 0.65 | 0.80 | 33 | 710 | 5.2 |
| 6 | " | CH$_3$ONa | 0.62 | 0.70 | 29 | 720 | 4.9 |
| 7 | " | ⟨C$_6$H$_5$⟩—ONa | 0.65 | 0.74 | 20 | 710 | 5.1 | the results of a tensile test, the yield strength was 690 Kg/cm and the elongation was less than 5%. C.I.P. of the polymer was 13.

Comparative Example 6

Except that an equimolecular amount of diethanolamine was used rather than N-methylethanolamine, a polymer was prepared by repeating the procedure described in Example 1. The polymer had a $\eta_{sp}/C$ of 0.49, and this was of a relatively low molecular weight. The polymer after heat treatment exhibited a $\eta_{sp}/C$ of 0.45. The product polymer had a tensile yield strength of 700 Kg/cm$^2$, an elongation less than 5% and a C.I.P. of 7.3.

Comparative Example 7

The same procedure of Comparative Example 6 was repeated except that 7.9 g of water was added to the n-butanol. As the result, a polymer having a $\eta_{sp}/C$ of 0.43 was obtained, indicating that the presence of water in the polymerization system produces a marked influence on the product polymer.

EXAMPLE 8

Using the same procedure as in Example 1 except that 7.8 g of water was added to n-butanol, a polymer was obtained having a $\eta_{sp}/C$ of 0.62. This demonstrated that the presence of water produced no substantial influential effect on polymerization.

Comparative Example 8

The procedure of Example 1 was repeated except for using equimolecular amount of N,N-dimethylethanolamine in place of N-methylethanolamine to obtain a polymer having a $\eta_{sp}/C$ of 0.75. The $\eta_{sp}/C$ of this poly- The polymer was found to have, as the result of a tensile test, a breaking strength of 530 Kg/cm$^2$ before it reached the yielding point and an elongation of 5%. The polymer was heavily colored and exhibited a C.I.P. of 22.

mer was lowered to 0.31 after heat treatment, showing a marked decrease in molecular weight. A test strip prepared for the tensile testing was extremely brittle, showing substantially no elongation. This polymer had a C.I.P. of 21.

Comparative Example 9

Polymerization was conducted according to the procedure of Example 1 except that equimolecular amount of triethanolamine was used in place of N-methylethanolamine to obtain a polymer having a $\eta_{sp}/C$ of 0.45. This - represents a further lower value of $\eta_{sp}/C$ from that of the polymer obtained in Comparative Example 6.

After heat treatment of this polymer, the $\eta_{sp}/C$ was lowered to 0.32. As the result of tensile test, the elongation was less than 5% and the tensile test specimen of this polymer broke at a load of 530 Kg/cm$^2$ before it reached the yielding point. C.I.P. of the polymer was 18.

Comparative Example 10

According to the Example 1 described in Japanese Laid-open Patent Publication No. 44625/1982, monoethanol amine was combined with manganese chloride and sodium hydroxide. 122 g (1 mol) of 2,6-dimethylphenol and 0.92 g (0.015 mol) of monoethanolamine were dissolved in 144 ml of xylene. To this solution were added a solution of 1.2 g (0.006 mol) of tetrahydrate of manganese chloride dissolved in 86 ml of methanol and a solution of 2.4 g (0.06 mol) of sodium hydroxide dissolved in 212 ml of water. Polymerization and post-treatment were conducted in the same manner as in Example 1 to obtain a polymer having a $\eta_{sp}/C$ of 0.63. When this polymer was subjected to heat treatment of 310° C., its $\eta_{sp}/C$ value was lowered to 0.51. In tensile test of a compression molded strip, the strip broke at a load of 610 Kg/cm$^2$ after an eleongation of 5% before arriving at its yielding point. C.I.P. of the polymer was 12.

EXAMPLE 9

A solution of 3 g (0.015 mol) of tetrahydrate of manganese chloride dissolved in 50 g of methanol and a solution of 2.8 g (0.05 mol) of potassium hydroxide dissolved in 50 g of methanol was prepared. To the above methanol solution of manganese chloride, 2.7 g (0.031 mol) of N-ethylethanolamine was added with stirring and to this resultant solution the methanol solution of potassium hydroxide was added with stirring to obtain a solution of a synthesized catalyst. All the above procedures were conducted in open air.

122 g (1 mol) of 2,6 dimethylphenol was dissolved in a mixture of 133 g of toluene and 100 g of n-butanol, and was introduced into a 2 liter jacketed reactor equipped with a reflux condenser, a thermometer, stirrer and an oxygen gas introducing nozzle. The temperature inside the reactor was adjusted at 25° C. by flowing warm water through the jacket while the contents were stirred.

Then, the catalyst solution prepared as described above was charged into the reactor while maintaining stirring of contents. Following the above procedure, oxygen gas was fed into the reactor at a rate of 450 Nml/min to set up a oxidative polymerization reaction. After about 30 minutes from the start of the reaction, fine particles of polymer began to form in the reaction liquid. The reaction was terminated after 6 hours from the start by cutting off the oxygen gas flow.

The precipitated particles of polymer were collected by filtration and washed with a solution comprising a mixture of methanol and hydrochloric acid. The precipitate was further washed with a fresh methanol and dried at 125° for 60 minutes in a vacuum to remove the remaining methanol to obtain a polymer at a yield as high as 95%. The $\eta_{sp}/C$ of this polymer was found to be 0.65.

The $\eta_{sp}/C$ of the polymer compression-molded at 310° C. for 20 minutes was found to be 0.69. Thus there was no occurrence of molecular weight lowering upon heating of this polymer.

A compression molded strip specimen had a tensile yield strength of 720 Kg/cm$^2$ and an elongation of 37%.

C.I.P. of the polymer was 4.6. The polymer was tenacious and exhibited little coloring.

EXAMPLE 10

The procedure of Example 9 was repeated except for using iso-propylalcohol in place of n-butanol to obtain a polymer had a $\eta_{sp}/C$ of 0.64 at a yield of 96%. This polymer had a tensile yield strength of 710 Kg/cm$^2$, an elongation of 35% and a C.I.P. of 4.6. The $\eta_{sp}/C$ of the polymer after heat treatment was 0.67.

EXAMPLE 11

The procedure of Example 9 was repeated except that tetrahydrate of manganese acetate was used in place of tetrahydrate of manganese chloride to obtain a polymer at a yield of 95%. The properties of the polymer are as follows:

| | |
|---|---|
| $\eta_{sp}/C$ | 0.66 |
| $\eta_{sp}/C$ (after heat treatment) | 0.70 |
| C.I.P. | 4.5 |
| Tensile yield strength | 720 Kg/cm$^2$ |
| Elongation | 36% |

EXAMPLE 12

A methanol solution of potassium permanganate was prepared by dissolving 2.4 g of potassium permanganate in 50 g of methanol. A methanol solution of sodium hydroxide was separately prepared by dissolving 1.3 g of sodium hydroxide in 50 g of methanol.

The procedure of Example 9 was repeated except that the aforesaid methanol solutions were used in place of the methanol solution of tetrahydrate of manganese chloride and the methanol solution of potassium hydroxide. A polymer having a $\eta_{sp}/C$ of 0.67 was obtained at a yield of 95%. The properties of the polymer were as follows:

| | |
|---|---|
| $\eta_{sp}/C$ (after heat treatment) | 0.71 |
| Tensile yield strength | 730 Kg/cm$^2$ |
| Elongation | 38% |
| C.I.P. | 4.7 |

EXAMPLE 13

Except that 2.9 g of trihydrate of sodium permanganate dissolved in 50 ml of methanol and 1.3 g of sodium hydroxide dissolved in 50 ml of methanol were used in place of the methanol solution of tetrahydrate of manganese chloride and the methanol solution of potassium hydroxide, the procedure of Example 9 was repeated. A polymer was obtained having a $\eta_{sp}/C$ of 0.66 and a C.I.P. of 4.7 at a yield of 94%.

Other properties of the polymer were as follows:

| | |
|---|---|
| $\eta_{sp}/C$ (heat treated polymer) | 0.70 |
| Tensile yield strength | 720 Kg/cm$^2$ |
| Elongation | 38% |

EXAMPLE 14

Except that an equimolecular amount of N-ethylisopropanolamine and potassium hydroxide were used in place of N-ethylethanolamine and sodium hydroxide, Example 9 was repeated. A polymer was obtained at a yield of 95%. The polymer had a $\eta_{sp}$ of 0.66.

The other properties of the polymer were as follows:

| | |
|---|---|
| $\eta_{sp}/C$ (heat treated polymer) | 0.70 |
| Tensile yield strength | 710 Kg/cm$^2$ |
| Elongation | 35% |
| C.I.P. | 4.6 |

EXAMPLE 15

1.4 g (0.0075 mol) of tetrahydrate of manganese acetate was dissolved in 50 ml of methanol and 1.0 g (0.025 mol) of sodium hydroxide was separately dissolved in 50 g of methanol. To the methanol solution of tetrahydrate of manganese acetate, 1.4 g (0.016 mol) of N-ethylethanolamine was added. Then, the methanol solution of sodium hydroxide was added, with stirring, to the mixture to obtain a catalyst solution.

A solution of 61 g (0.50 mol) of 2,6-dimethylphenol dissolved in 400 g of toluene was prepared.

Except that the catalyst solution and toluene solution of 2,6-dimethyl were used in place of the catalyst solution and the toluene-n-butanol mixture solution of 2,6-dimethylphenol, the procedure as described in Example 9 was repeated to carry out a polymerization reaction. In the entire course of this polymerization reaction, no evolution of fine particles of polymer was observed in the reaction system. After the termination of the reaction, 300 g of methanol was added to the reaction product solution under stirring to precipitate polymer.

The precipitate was filtered and rinsed with a solution mixture of methanol and hydrochloric acid. After final rinse with fresh methanol, the precipitate was finally dried under vacuum of 145° C. for 45 minutes to remove the remaining methanol. The yield of the polymer was 94%. The properties of this polymer were as follows:

| | |
|---|---|
| $\eta_{sp}/C$ | 0.61 |
| $\eta_{sp}/C$ (after heat treatment) | 0.67 |
| Tensile yield strength | 710 Kg/cm |
| Elongation | 36% |
| C.I.P. | 4.7 |

EXAMPLE 16

1.2 g (0.006 mol) of tetrahydrate of manganese chloride was dissolved in 150 g of methanol. The methanol solution was charged into a 2 liter jacketed reactor equipped with a thermometer, a reflux condenser, a stirrer and oxygen gas introducing nozzle. The inner temperature of the reactor was adjusted at 30° C., while the methanol solution was under stirring. 0.9 g (0.012 mol) of N-methylethanolamine was added to the methanol solution into which oxygen gas was blown at a rate of 100 Nml/min. To this mixture 1.3 g (0.033 mol) of sodium hydroxide dissolved in 50 g of methanol was added, within 20 minutes from the start of addition of N-methylethanolamine, to prepare the final catalyst admixture.

122 g (1 mol) of 2,6-dimethyldisubstituted phenol dissolved in 600 g of xylene and 200 g n-butanol was then introduced into the reactor. Polymerization was caused to start by charging oxygen gas at a rate of 500 Nml/min. The temperature of the polymerization reaction system was maintained at 30° C. by adjusting the temperature of the jacket. After 30 minutes from the start of the reaction fine particles of polymer appeared. The reaction was brought to terminate after 6 hours from the start by cutting off the introduction of oxygen. The precipitated polymer was then filtered and rinsed with a mixture of hydrochloric acid and methanol. The filtered precipitate was further rinsed with fresh methanol and dried finally at 145° C. in vacuo for 30 minutes to obtain a polyphenyleneether in powder form at a yield of 95%. The polymer exhibited a $\eta_{sp}/C$ of 0.65. Other properties of this polymer are tabulated in Table 2.

EXAMPLES 17-20

The same procedure as described in Example 16 were repeated except that the reactants and conditions given in Table 2 were used in place of N-methylalkanolamine, sodium hydroxide or oxygen for the preparation of the catalytic admixture.

Polymers obtained were evaluated with respect to $\eta_{sp}/C$, C.I.P., and tensile properties. The results are given in Table 2.

TABLE 2

| | Catalyst Component | | | Properties of Polymers | | | | |
|---|---|---|---|---|---|---|---|---|
| | | | Oxygen | Viscosity ($\eta_{sp}/C$) | | | | Tensile Yield |
| Examples | N—alkylalkanol-amines | Basic Compound | Containing Gas | as Polymerized | After Heat Treatment | C.I.P. | Elongation (%) | Strength (Kg/cm$^2$) |
| 16 | N—methyl-ethanolamine | NaOH | Oxygen | 0.65 | 0.74 | 4.7 | 31 | 700 |
| 17 | N—ethylethanol-amine | " | " | 0.62 | 0.64 | 4.6 | 32 | 710 |
| 18 | N—ethylethanol-amine | " | Oxygen/Nitrogen (50/50 by volume) | 0.63 | 0.71 | 4.8 | 32 | 710 |
| 19 | N—ethylethanol-amine | " | Air | 0.62 | 0.70 | 4.7 | 29 | 720 |
| 20 | N—ethylethanol-amine | " | Oxygen/Nitrogen (10/90 by | 0.58 | 0.65 | 4.8 | 27 | 720 |

TABLE 2-continued

| | Catalyst Component | | | Properties of Polymers | | | | |
| --- | --- | --- | --- | --- | --- | --- | --- | --- |
| | | | Oxygen | Viscosity ($\eta_{sp}$/C) | | | | Tensile Yield |
| Examples | N—alkylalkanol-amines | Basic Compound | Containing Gas (volume) | as Polymerized | After Heat Treatment | C.I.P. | Elongation (%) | Strength (Kg/cm$^2$) |

What is claimed is:

1. A process for oxidative polymerization of 2,6disubstituted phenol, which comprises coupling a 2,6-disubstituted phenol with an oxygen containing gas in the presence of a catalyst comprising a manganese compound, an N-alkylalkanolamine and a basic compound selected from the hydroxides, alkoxides and phenoxides of a metal from group IA of the periodic table.

2. A process according to claim 1, wherein the 2,6-disubstituted phenol is 2,6-dimethylphenol.

3. A process according to claim 1 or 2, wherein the basic compound is sodium hydroxide or potassium hydroxide.

4. A process according to claim 1 or claim 2, wherein the N-alkylalkanolamine is N-alkylethanolamine.

5. A process according to claim 4, wherein the alkyl group of the N-alkylethanolamine is a saturated hydrocarbon group having 1 to 4 carbon atoms.

6. A process according to claim 1, wherein polymerization is carried out in a heterogeneous phase system and polymer is precipitated at a later stage of polymerization.

7. A process according to claim 1, wherein the catalyst is prepared by mixing the manganese compound, the N-alkylalkanolamine and the basic compound in the presence of oxygen.

* * * * *

UNITED STATES PATENT AND TRADEMARK OFFICE
CERTIFICATE OF CORRECTION

PATENT NO. : 4,558,119
DATED : December 10, 1985
INVENTOR(S) : IZUMI YAMASHITA ET AL It is certified that error appears in the above—identified patent and that said Letters Patent is hereby corrected as shown below:

Column 13, Claim 1, line 1, after "2,6" insert a hyphen.

Signed and Sealed this

Twenty-fourth Day of June 1986

[SEAL]

Attest:

DONALD J. QUIGG

Attesting Officer

Commissioner of Patents and Trademarks